United States Patent [19]

Martin et al.

[11] Patent Number: 6,084,695
[45] Date of Patent: Jul. 4, 2000

[54] OPTICAL FIBER WAVELENGTH MULTIPLEXER AND DEMUTIPLEXER

[75] Inventors: Philippe Martin, Pontchartrain; Bernard Laloux, Villepreux; Bertrand Merigot; Hervé Lefervre, both of Paris, all of France

[73] Assignee: Photonetics, Marly Le Roi, France

[21] Appl. No.: 08/891,971

[22] Filed: Jul. 11, 1997

[30] Foreign Application Priority Data

Feb. 14, 1997 [FR] France .................................. 97 01764

[51] Int. Cl.[7] .................................................. H04J 14/02
[52] U.S. Cl. ............................................ 359/131; 359/130
[58] Field of Search .................................. 359/127, 129, 359/130, 131, 634

[56] References Cited

U.S. PATENT DOCUMENTS

| | | | |
|---|---|---|---|
| 4,472,797 | 9/1984 | Nicia | 359/131 |
| 4,589,740 | 5/1986 | Durremberger | 359/224 |
| 4,622,662 | 11/1986 | Laude et al. | 359/131 |
| 4,708,425 | 11/1987 | Gouali et al. | 359/131 |
| 4,748,614 | 5/1988 | Dammann et al. | 359/131 |
| 5,361,155 | 11/1994 | Chiaroni et al. | 359/131 |
| 5,457,573 | 10/1995 | Iida et al. | 359/130 |

FOREIGN PATENT DOCUMENTS

| | | |
|---|---|---|
| 0 067 972 | 5/1982 | European Pat. Off. . |
| 2 219 869 | 12/1989 | United Kingdom . |

OTHER PUBLICATIONS

"32 Channel WDM Multiplexer With 1NM Channel Spacing and 0.7NM Bandwidth", D. R. Wisely, Electronics Letters, vol. 27, No. 6, Mar. 14, 1991, pp. 520–521.

Patent Abstracts of Japan, vol. 011, No. 276 (P–613), Sep. 8, 1987 & JP 62–075406, Fujitsu Ltd., Apr. 7, 1987.

"Widely Tunable Single–Longitudinal–Mode Pulsed Dye Laser", T. D. Raymond et al, Optics Letters, vol. 14, No. 20, Oct. 15, 1989, pp. 1116–1118.

"High–Capacity Wavelength Demultiplexer With a Large-–Diameter Grin Rod Lens", B. D. Metcalf et al, Applied Optics, vol. 21, No. 5, Mar., 1982, New York, U.S., pp. 794–796.

Wide Passband Grating Multiplexer for Multimode Fibers, B. Hillerich et al, Journal of Lightwave Technology, vol. 3, No. 3, Jun., 1985, New York, U.S., pp. 590–594.

*Primary Examiner*—Jeffery A. Hofsass
*Assistant Examiner*—John Tweel, Jr.
*Attorney, Agent, or Firm*—Arent Fox Kintner Plotkin & Kahn

[57] ABSTRACT

The present invention relates to an optical fiber wavelength multiplexing or demultiplexing device comprising.

The multiplexer comprises input fibers (101 to 105) designed for carrying luminous beams at different wavelengths ($\lambda 1, \lambda 2, \ldots, \lambda n$), an output fiber (161) designed for carrying the whole set of such luminous beams, a dispersing system (107) receiving luminous beams from the input fibers (101 to 105) in an input plane and generating superimposed luminous beams designed for the output fiber (161) in an output plane.

A converging lens array (171 to 175) is located in the input plane, whereas a lens corresponds to each input fiber and whereby the said input fiber is placed in the focal point of the said lens.

The demultiplexer comprises the same elements, whereas the roles of the fibers and input/ouput planes are reversed.

20 Claims, 4 Drawing Sheets

OPTICAL FIBER WAVELENGTH MULTIPLEXER AND DEMUTIPLEXER

This invention relates to optical fiber wavelength multiplexers and demultiplexers.

These devices become more and more important with the development of optical fiber telecommunications.

Indeed, multiplexing and demultiplexing technologies enable transmission of an increased volume of information in the same optical fiber. Amplification technologies are now reliable and enable the implementation of transponders to amplify the set of channels, at different wavelengths, without calling for amplification on a wavelength-to-wavelength basis, which would imply demultiplexing, then remultiplexing the signals at the level of each transponder.

The operation of a device according to the prior art is illustrated on FIGS. 1 and 2.

FIG. 1 represents a multiplexer. Input fibers 1 to 5 each have their ends located on a plane 6 constituting the input plane of the multiplexer. This multiplexer comprises a dispersing element or grating 7, a collimation optical element 8, a reflector system 9 and produces an output beam 10 collected by an output fiber 61. The optical elements of the multiplexer, the grating 7 and the input optical elements 8 as well as the reflector optical system 9 are laid out in such a way that the input beams, spatially separate in the input plane 6, are superimposed at the output point 62 and coupled in the output fiber 61.

On FIG. 2, each of the input fiber 1 to 5 has been represented, together with their optical cores 11, 21, 31, 41, 51, their claddings 12, 22, 32, 42, 52 and their coatings 13, 23, 33, 43, 53.

In such a system, the input plane defines, in its geometrical dimension x, the input function $F(\lambda)$ of the multiplexer, represented approximately on FIG. 2, each of the fibers cutting through an associated elementary passband 14, 24, 34, 44 and 54.

The widths $\Delta\lambda 1, \ldots, \Delta\lambda 5$ of each of these elementary bands depend on the diameters of the cores 11, 21, 31, 41, 51 of each optical fiber 1 to 5 and are generally small in relation to the distance $d(\lambda 1, \lambda 2), \ldots, d(\lambda 4, \lambda 5)$ separating the central wavelengths $\lambda 1, \ldots, \lambda 5$ from the elementary bands, consecutive to the beams provided by each input fiber 1 to 5 and superimposed on the output fiber 61.

We shall designate later on by $\Delta\lambda$ the width of the elementary bands $\Delta\lambda i, \ldots, \Delta\lambda n$ and by $d(\lambda i, \lambda i+1)$ the distance between the central wavelengths of two consecutive elementary bands.

Various propositions have already been made in order to try and increase the $\Delta\lambda/d(\lambda i, \lambda i+1)$ ratio. We know that this $\Delta\lambda/d(\lambda i, \lambda i+1)$ ratio=a/δ, where a corresponds to the diameter of the transmitted mode, which is substantially equal to the core diameter of the fiber and where δ is the distance between two cores of consecutive fibers. In practice, when the coating is removed, this δ distance is at least equal to the diameter of the cladding.

It has been suggested to reduce the thickness of the claddings 13, 23, 33, 43, 53, which enables reducing δ and hence the distance $d(\lambda i, \lambda i+1)$ without reducing the widths of the bands $\Delta\lambda$.

However, this lay-out is difficult to control and to implement.

The purpose of the invention is to suggest an optical fiber wavelength optical multiplexer-demultiplexer which exhibits a significant improvement of the $\Delta\lambda/d(\lambda i, \lambda i+1)$ ratio.

It is another purpose of the invention to construct such multiplexer-demultiplexing device in which the elementary passband associated to each fiber shows front edges towards low frequencies and towards high frequencies which are as steep as possible and in which each transmitted wavelength undergoes the same attenuation. Such an elementary transfer function, ideally rectangular in shape, enables to obtain accurate delimitation of the passband and uniform transmission within this band.

To this end, the invention relates to an optical fiber wavelength multiplexing device comprising:

input fibers designed for carrying luminous beams at different wavelengths $\lambda 1, \lambda 2, \ldots, \lambda n$, an output fiber designed for carrying the whole set of such luminous beams, a dispersing system receiving luminous beams from the input fibers in an input plane and generating superimposed luminous beams designed for the output fiber in an output plane.

According to the invention, a converging lens array is located in the input plane, whereas a lens corresponds to each input fiber and whereby the said input fiber is placed in the focal point of the said lens.

According to the invention, it is also possible to construct a demultiplexing device.

The device according to the previous art described above with reference to FIGS. 1 and 2 can also operate in reverse direction, as a demultiplexer. The fiber 11 is then an input fiber carrying a luminous beam at various wavelengths and the fibers 1 to 5 becoming thus output fibers, each receiving a beam at a given wavelength, separate spatially from the beams coming out at the other wavelengths. The invention can also be applied to such a demultiplexer.

The device according to the invention is then a fiber wavelength demultiplexer comprising output fibers designed for carrying luminous beams at different wavelengths $\lambda 1, \ldots, \lambda n$, an input fiber designed for carrying the whole set of such luminous beams, a dispersing system receiving the luminous beam from the input fiber in an input plane and generating superimposed luminous beams designed for the output fibers in an output plane.

According to the invention, a converging lens array is located in the output plane, whereas a lens corresponds to each output fiber and whereby the said output fiber is placed in the focal point of the said lens.

According to various embodiments each providing its particular advantages, the device according to the invention comprises:

a dispersing system comprising a diffraction grating, a diffraction grating used according to a Littrow assembly, a diffraction grating used according to a Litmann Metcalf assembly, a refraction angular deviation system containing a prism located between the grating and the fibers.

The optical fibers exhibit advantageously a core of approx. 10 μm, a cladding of approx. 125 μm and a coating of approx. 250 μm, and the lenses have a focal length of 500 μm to 1 mm approx. and a diameter of 250 μm approx.

The lenses are preferably a planar microlens array with index gradient.

The device according to the invention may comprise a reflecting system after the dispersing system, which is advantageously a dihedron whose edge is perpendicular to the lines of the gratings.

The invention will be described in detail with reference to the appended drawings, in which.

Figure 1:
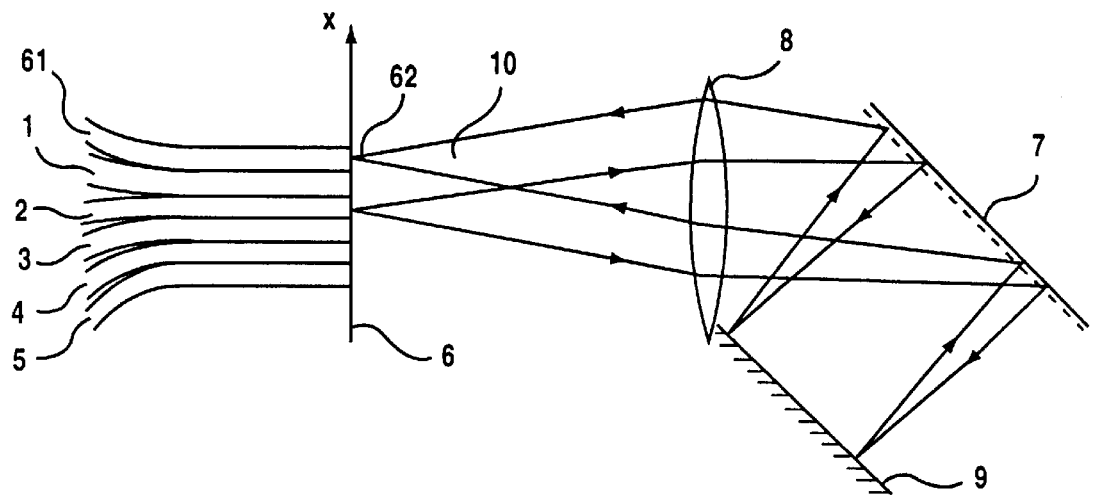
FIG. 1 is a representation of the optical diagram of a multiplexer of the previous art.
Figure 2:
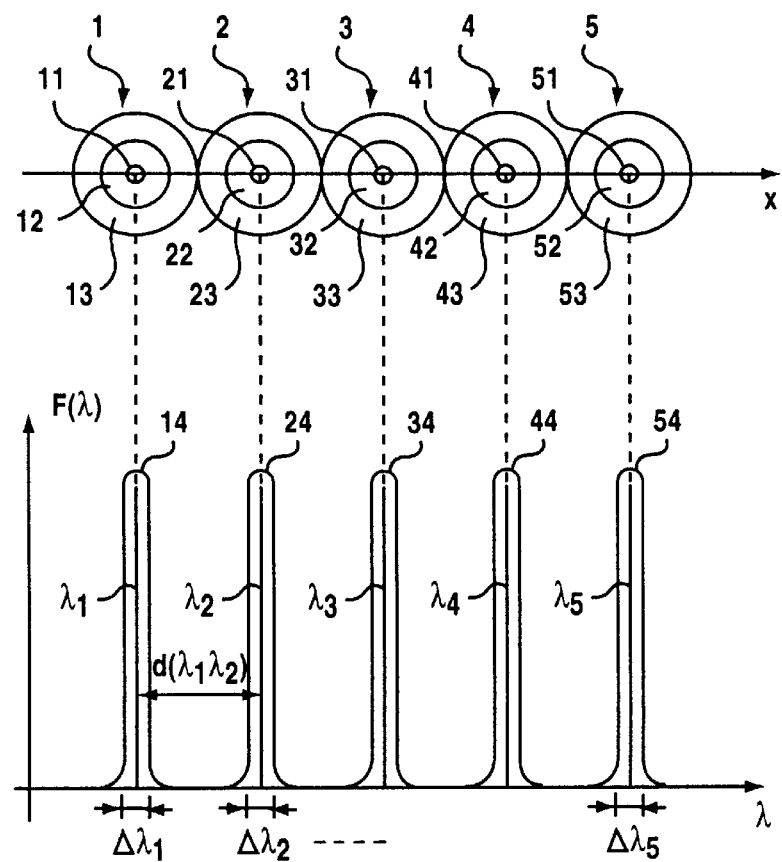
FIG. 2 is a diagrammatic representation showing the input function of the multiplexer of FIG. 1, in relation to the cross section of the input fibers.
Figure 3:
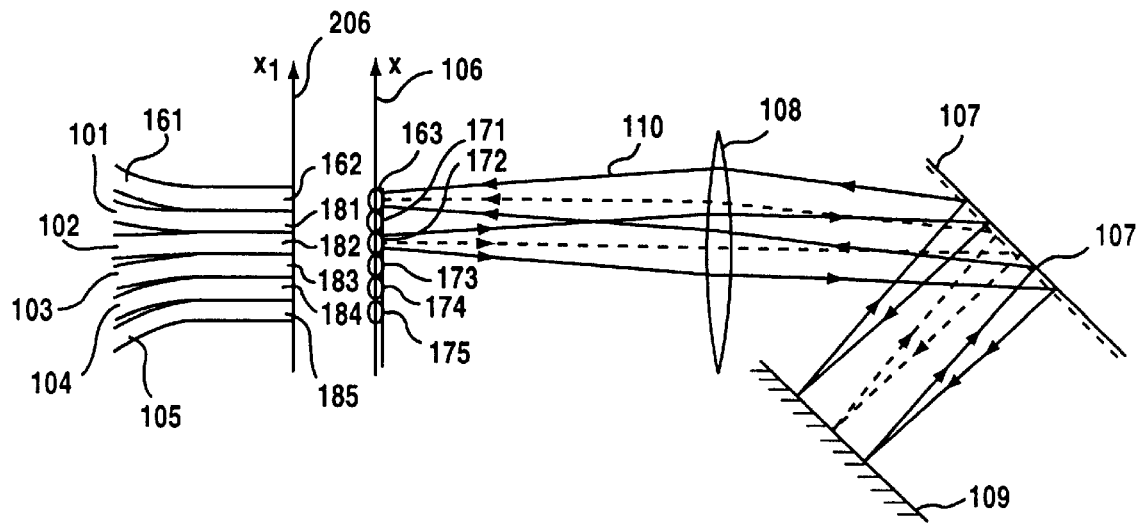
FIG. 3 is a representation of the optical diagram of a multiplexer according to the invention.
Figure 4:
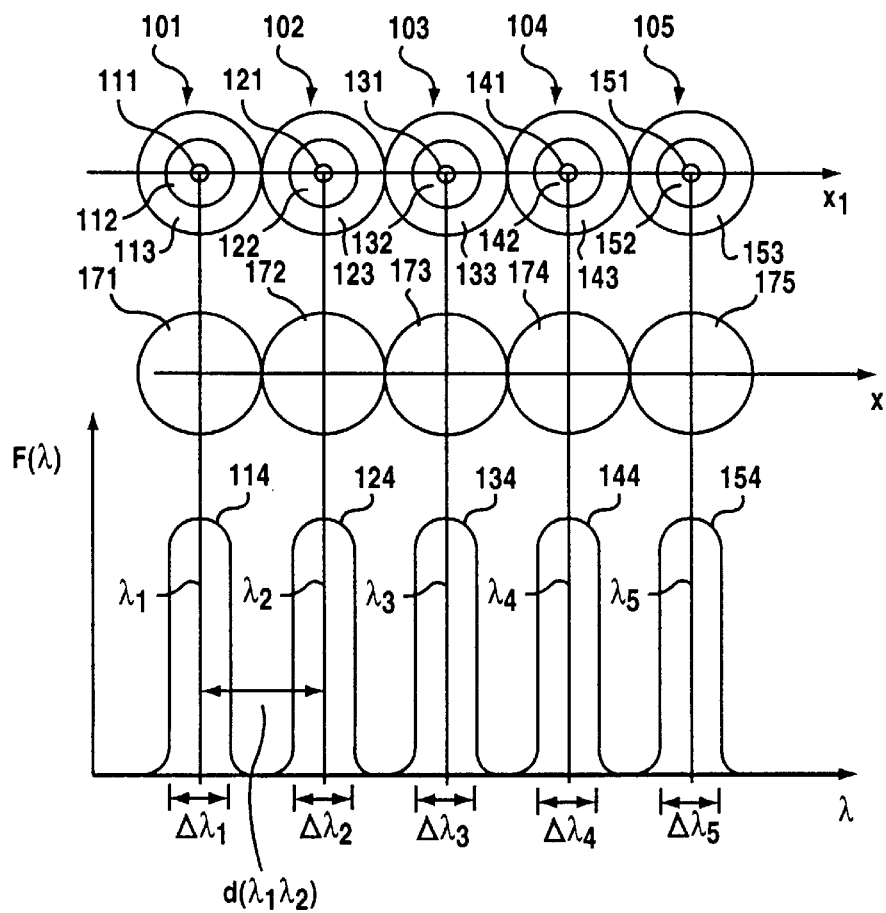
FIG. 4 is a diagrammatic representation showing the input function of the multiplexer of FIG. 3, in relation to the cross section of the input fibers.
Figure 5:
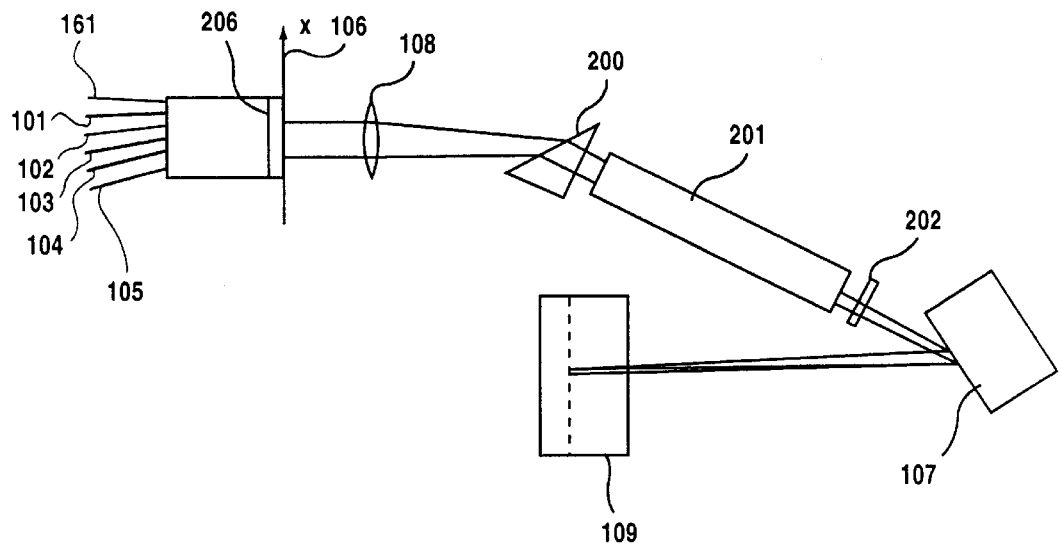
FIG. 5 is a diagrammatic representation of an improved embodiment of the invention.
Figure 6:
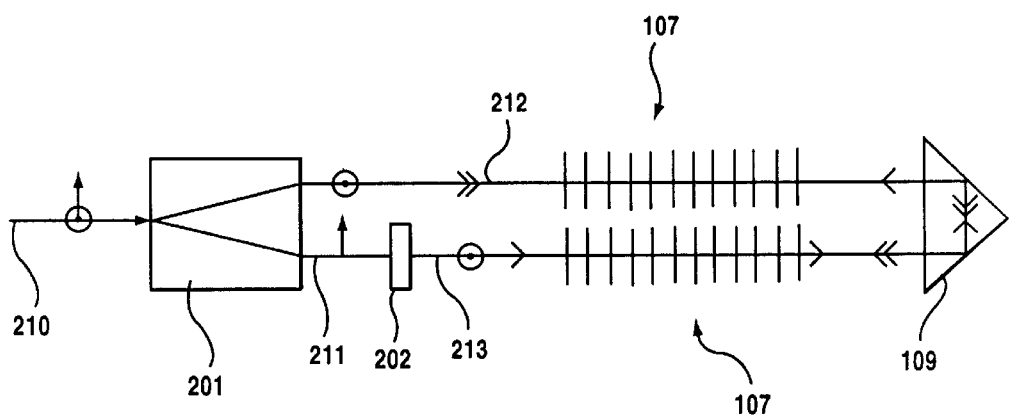
FIG. 6 is a front view of the exploded optical diagram of the device according to the invention.

The operation of the device according to the invention is thus illustrated by FIGS. 3 and 4.

FIG. 3 represents a multiplexer. Input fibers 101 to 105 each have their ends located on an end plane 206. This multiplexer comprises a dispersing element or grating 107, a collimation optical element 108, a reflector system 109 and produces an output beam 110 collected by a output fiber 161. The optical elements of the multiplexer, the grating 107, the collimation optical element 108 as well as the reflector system 109 are laid out in such a way that the input beams, spatially separate in the input plane 106, are superimposed at the output point 162 and coupled in the output fiber 161. The radii represented approximately show the combination of the input fiber 183 with the output fiber 163; whereas the corresponding beam has a wavelength $\lambda 2$.

The reflector system 109 is an adjustment element whose orientation enables the centring of the luminous beams with respect to the wavelengths considered on the elementary passbands. The reflector system 109 is advantageously a dihedron, composed of two perpendicular planar mirrors whose edge is perpendicular to the lines of the grating (the plane of FIG. 3 is the dispersion plane, it is itself perpendicular to the lines of the grating and hence parallel to the edge of the dihedron).

When using such a reflector system 109, the luminous beam is twice dispersed by the grating 107 and the output and input planes are superimposed. In certain particular applications, the reflector system 109 can be replaced with an optical system making the diffracted luminous beam converge, once on an output fiber whose end is placed at its focal point.

On FIG. 4, each of the fibers 101 to 105 has been represented with their optical cores 111, 121, 131, 141, 151, their claddings 112, 122, 132, 142, 152 and their coatings 113, 123, 133, 143, 153.

The ends of the fibers are in an end plane 206 represented by the axis xl on FIG. 3. In the input plane 106 represented by the axis x, are placed lenses 163, 171, 172, 174, 175 equal in number to the input and output fibers, whereas each end 181 to 185 of the fibers lies at the focal point of the corresponding lens 171 to 175.

The spacing between two consecutive input lenses 171 to 175 is equal to the spacing between each consecutive fiber 101 to 105. In practice, it is interesting and possible that this spacing is greater than the diameter of the coatings 113, 123, 133, 143, 153. This enables simple positioning of the ends of the fibers, without curving, whether the coating at the end is removed or maintained.

In such a system, the input plane determines, in its geometrical size x, the input function $F(\lambda)$ of the multiplexer which is represented approximately on FIG. 4, whereas each fiber/lens assembly cuts through an associated elementary passband 114, 124, 134, 144 and 154.

Indeed, the apparent dimension of the core of fibers 101 to 105 as seen by the dispersion device 107 is that of the zone of each lens lit by the associated fiber, whereby its diameter is greater than the actual diameter of the fibers. The diameter of this zone is thus much greater than the actual mode diameter of the fiber, which leads to significant widening of the elementary bands $\Delta\lambda 1, \Delta\lambda 2, \Delta\lambda 3, \Delta\lambda 4, \Delta\lambda 5$.

The widths $\Delta\lambda 1, \ldots, \Delta\lambda 5$ of each elementary band depending on the apparent diameter of the cores 111, 121, 131, 141, 151 of each optical fiber 101 to 105 are increased with respect to the corresponding values of the prior art, without the distances $d(\lambda 1, \lambda 2)$ separating the central wavelengths $\lambda 1, \ldots, \lambda 5$ of the beam provided by each input fiber 101 to 105 and superimposed on the output fiber 161, should be modified. Thus, we obtain a better $\Delta\lambda/d(\lambda i, \lambda i+1)$.

The lenses 163 and 171 to 175 are advantageously planar microlenses with index gradient, constructed on a single common support making up a header. Such lenses are marketed by the NSG AMERICA, INC. which calls them "Planar Microlens Array (PML)". Thus, we obtain particularly satisfactory results which we may assume as due to the fact that the relative positioning of these lenses is particularly rigid and stable, that their overall adjustment is therefore simplified and that these lenses exhibit very similar optical properties in relation to one another, whereas their manufacturing process ensures very good reproducibility.

FIG. 4 shows diagrammatically the input spectral bands by steep front edge functions, this is a diagrammatic representation enabling very simple explanation of the invention. It is well-known that the shapes of these passbands are in reality quite close to Gaussian curves.

The luminous beams used in the telecommunications systems are generally laser beams whose spectral widths are weak with respect to the elementary passbands of the multiplexer $\Delta\lambda 1, \ldots, \Delta\lambda 5$. However, these wavelengths are liable to vary due to divers instabilities, for instance temperature variations. The widening of the elementary passbands $\Delta\lambda 1, \ldots, \Delta\lambda 5$ obtained according to the invention enables to improve the tolerance of the telecommunication systems in relation to these variations.

Thus, whatever the wavelengths of the beams addressed by the input fibers 101 to 105, providing each of them is comprised within the passband of the fiber which carries it, the said wavelengths are addressed on the fiber 161 and coupled to them.

So far, we have described a multiplexer. Obviously, by reversing the operation, we can obtain a demultiplexer which will provide comparable advantages as regards the tolerances of the wavelengths processed.

The fiber 161 thus becomes an input fiber carrying the multiplexed beam, at the various wavelengths, after demultiplexing, each of the output fibers 101 to 105 is coupled to the beam corresponding to a particular wavelength.

The wavelengths affected are advantageously those produced by the Erbium over the band ranging from 1530 to 1565 nm.

The optical fibers have advantageously a core of 10 $\mu$m diameter, a cladding of 125 $\mu$m diameter and a coating of 250 $\mu$m diameter.

They are advantageously positioned, at their ends, in relation to one another, in silicon support in which V-shaped ribs have been engraved. Each of these ribs accommodates a fiber which is thus positioned accurately. The microlenses 163, 171 to 175 have advantageously a focal distance of approx. 500 $\mu$m–1 mm and a diameter of 250 $\mu$m.

These microlenses 163 and 171 to 175 having themselves accurate, regular and stable dimensions, these microlenses and the ends of the fibers can then be aligned easily.

These lenses 163, 171 to 175 are advantageously constructed in the form of a planar microlens array with index gradient.

When the spacings between the ends of fibers 181, 182, . . . , 185 are equal, which in practice constitutes much simpler an embodiment than the determination of various spacings, the spacing between the wavelengths d($\lambda$1, $\lambda$2), . . . , d($\lambda$4, $\lambda$5) is not perfectly linear due to the dispersion law of the grating 7.

This non-linearity can be compensated for by the implementation, in combination with the grating, of a prism 200. This prism placed between the input plane 106 and the optical element 108, generates an angular deviation of the luminous beam according to the refraction laws. These laws are between the collimation optical element 108 and the reflector 109, equally non-linear, but since this non-linearity lies in reverse direction to that introduced by the dispersion laws of the grating 107, the total non-linearity is nil.

Another detrimental effect liable to be introduced by the grating 107 is a dependence in relation to polarization.

When the transmitted power handling required imposes to break free from this dependence, it is possible to introduce a polarization separator 201 followed by a plate $\lambda$/2 202 on one of the beams between the collimation optical element 108 and the grating 107, whereby the reflector 109 is a dihedron with a edge perpendicular to the grating 107 lines.

The polarization separator 201 splits an incident beam 210 into a first and a second parallel secondary beams 211 and 212, with light linearly polarized along orthogonal directions. The plate $\lambda$/2 202 is located on the path of the first secondary beam 211.

The first secondary beam 211 has its polarization direction parallel to the grating 107 lines, whereas the second secondary beam 212 has its polarization direction perpendicular to these lines. The plate 202 rotates the parallel polarization of the first secondary beam 211 in order to bring it into perpendicular polarization. The first secondary beam 211 thus obtained and the second secondary beam 212 will both drive the grating with linear polarization perpendicular to the lines. Thus, a lot of energy is saved, since the losses generated by diffraction on the grating 107 are reduced as much as can be.

In order to bring each elementary passband 701 having a maximum 704 even closer to rectangular shape, it is possible to place an additional filter, acting on each of them. The additional filtering 702 is centred on the same wavelength 704, $\lambda$i as the passband and attenuates its peak. Thus, the resulting passband 703 is flattened.

This filtering can be performed individually for each wavelength. In the case of a multiplexer, a wavelength filter is then interposed on each channel between each input fiber and the multiplexer.

This filtering can also be performed by a single filter, for instance a Fabry-Perot filter, little selective (or Fizeau filter), determined in such a way that the period of its transmission spectrum is equal to that of the central wavelengths of the elementary bands of the multiplexer. This single filter can be accommodated in a superimposition region of the channels, either in the cavity of the multiplexer, in the superimposition region of the luminous beams, regardless of their wavelengths, between the grating 107 and the mirror 109, or in the case of the multiplexer, in front of the output fiber.

Figure 7A:
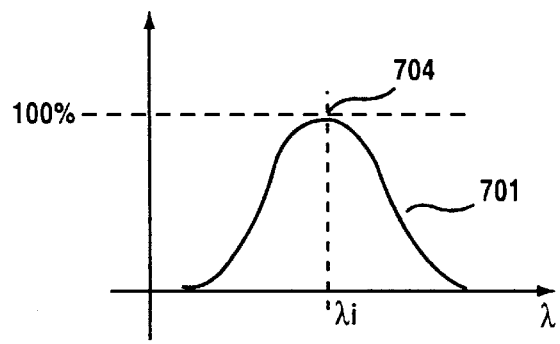
FIG. 7 is a representation of the adjunction effect of attenuation filters.

FIG. 7a is representation of an elementary passband 701 without a filter, its peak 704 is centred on $\lambda$i.

Figure 7B:
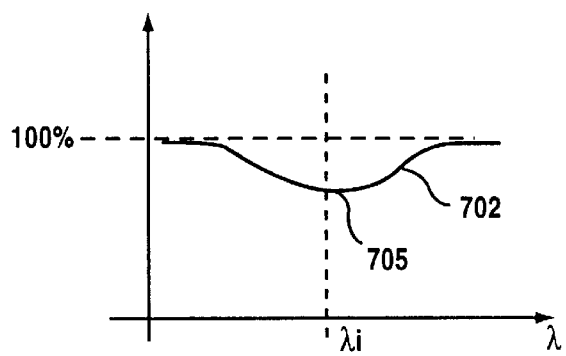
Figure 7C:
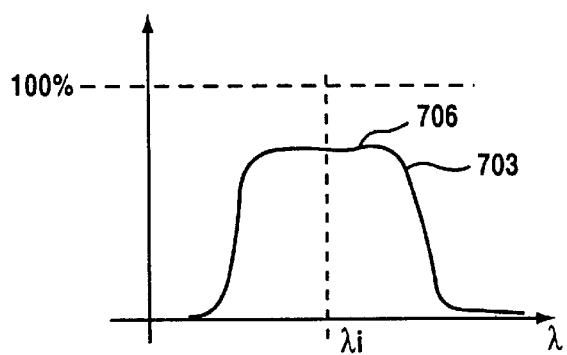

FIG. 7b is a representation of the passband of a filter, its attenuation reaches a peak at 705 centred on $\lambda$i and FIG. 7c represents the passband resulting from the implementation of the filter, whereas the maximum transmission region 706 is flattened.

The description has been made with reference to figures representing five input fibers. This is a simple illustrative example, whereas a much greater number of fibers can be used, with the corresponding number of multiplexed or demultiplexed wavelengths, thanks to a single device complying with the invention.

What is claimed is:

1. An optical fiber wavelength multiplexing device comprising:

input fibers (101 to 105) designed for carrying luminous beams at different wavelengths ($\lambda$1, $\lambda$2 . . . , $\lambda$n), an output fiber (161) designed for carrying the whole set of such luminous beams, a dispersing system (107) receiving luminous beams for the input fibers (101 to 105) in an end plane and generating superimposed luminous beams designed for the output fiber (161) in an output plane, and a collimation optical element optically positioned between the fibers and the dispersing system, characterised in that a converging lens array (171 to 175) is located in the input plane, whereas a lens corresponds to each input fiber and whereby the said input fiber is placed in the focal point of the said lens wherein a pitch between at least two consecutive lenses corresponding to input fibers is equal to a pitch between each consecutively arranged fiber.

2. An optical fiber wavelength demultiplexing device comprising:

output fibers designed for carrying luminous beams at different wavelengths ($\lambda$1, $\lambda$2, . . . , $\lambda$n), an input fiber designed for carrying the whole set of such luminous beams, a dispersing system receiving the luminous beam for the input fiber in an end plane and generating spatially separate luminous beams designed for the output fiber in an output plane, and a collimation optical element optically positioned between the fibers and the dispersing system, characterised in that a converging lens array is located in the output plane, whereas a lens corresponds to each output fiber and whereby the said output fiber is placed in the focal point of the said lens, wherein a pitch between at least two consecutive lenses corresponding to input fibers is equal to a pitch between each consecutively arranged fiber.

3. A device according to claims 1 or 2, characterised in that the device comprises a converging lens array located in the input/output plane, a lens corresponding to each input fiber and to each output fiber, whereby each fiber is placed in the focal point of the said lens.

4. A device according to claims 1 or 2, characterised in that the dispersing system (107) comprises a diffraction grating.

5. A device according to claim 4, characterised in that the diffraction grating (107) is used following a Littrow assembly.

6. A device according to claim 4, characterised in that the diffraction grating (107) is used following a Litmann-Metcalf assembly.

7. A device according to claims 1 or 2, characterised in that it contains a prism (200) located between the grating and the fibers.

8. A device according to claims 1 or 2 characterised in that the optical fibers (161, 101 to 105) exhibit advantageously a core of approximately 10 $\mu$m, a cladding of approximately 125 μm and a coating of approximately 250 μm, and the lenses (163, 171 to 175) have a focal length of approximately 500 μm and a diameter of approximately 250 μm.

9. A device according to claims 1 or 2, charaterised in that the lenses (163, 171 to 175) have a microlens header with index gradient.

10. A device according to claims 1 or 2, characterised in that the wavelengths (λ1, . . . , λn) lie within the amplification range of Erbium, between 1530 and 1565 nm.

11. A device according to claims 1 or 2, characterised in that it comprises a retroreflecting dihedron located after the dispersing system.

12. An optical fiber wavelength multiplexing/demultiplexing device comprising:
   input fibers (101 to 105) designed for carrying luminous beams at different wavelengths (λ1, λ2, . . . λn),
   an output fiber (161) designed for carrying the whole set of such luminous beams,
   a dispersing system (107) receiving luminous beams from the input fibers (101 to 105) in an end plane and generating superimposed luminous beams designed for the output fiber (161) in an output plane, and
   a collimation optical element optically positioned between the fibers and the dispersing system,
   characterised in that the device comprises a converging lens array located in the end plane, whereas a lens corresponds to each input fiber and to each output fiber and whereby each fiber is placed in the focal point of the said lens,
   wherein a pitch between at least two consecutive lenses corresponding to input fibers is equal to a pitch between each consecutively arranged fiber.

13. A device according to claims 1 or 2, characterised in that it contains a filter on each channel, in order to flatten the associated elementary passband.

14. A device according to claims 1 or 2, characterised in that it contains a Fabry-Perot filter loacted in a superimposition zone of the channels and flattening all the elementary passands.

15. An optical fiber wavelength multiplexing/demultiplexing device comprising:
   input fibers (101 to 105) designed for carrying luminous beams at different wavelengths (λ1, λ2, . . . , λn),
   an output fiber (161) designed for carrying the whole set of such luminous beams,
   a dispersing system (107) receiving luminous beams for the input fibers (101 to 105) in an input plane and generating superimposed luminous beams designed for the output fiber (161) in an output plane, and
   a collimation optical element optically positioned between the fibers and the dispersing system,
   characterised in that the device comprises a converging lens array located in the input/output plane, whereas a lens corresponds to each input fiber and to each output fiber, whereby each fiber is placed in the focal point of the said lens and whereas the lenses (171 to 175) constitute a microlens header with index gradient,
   wherein a pitch between at least two consecutive lenses corresponding to input fibers is equal to a pitch between each consecutively arranged fiber.

16. An optical fiber wavelength multiplexing/demultiplexing device comprising:
   input fibers (101 to 105) designed for carrying luminous beams at different wavelengths (λ1, λ2, . . . , λn),
   an output fiber (161) designed for carrying the whole set of such luminous beams,
   a dispersing system (107) receiving luminous beams for the input fibers (101 to 105) in an input plane and generating superimposed luminous beams designed for the output fiber (161) in an output plane, and
   a collimation optical element optically positioned between the fibers and the dispersing system,
   characterised in that the device comprises a converging lens array located in the end plane, whereas a lens corresponds to each input fiber and to each output fiber, whereby each fiber is placed in the focal point of the said lens, whereas the lenses (171 to 175) constitute a planar microlens array with index gradient and whereby the device comprises a retroreflecting dihedron located after the dispersing system,
   wherein a pitch between at least two consecutive lenses corresponding to input fibers is equal to a pitch between each consecutively arranged fiber.

17. An optical fiber wavelength multiplexing/demultiplexing device comprising:
   input fibers (101 to 105) designed for carrying luminous beams at different wavelengths (λ1, λ2, . . . , λn),
   an output fiber (161) designed for carrying the whole set of such luminous beams,
   a dispersing system (107) receiving luminous beams for the input fibers (101 to 105) in an input plane and generating superimposed luminous beams designed for the output fiber (161) in an output plane, and
   a collimation optical element optically positioned between the fibers and the dispersing system,
   characterised in that the device comprises a converging lens array located in the end plane, whereas a lens corresponds to each input fiber and to each output fiber, whereby each fiber is placed in the focal point of the said lens and in that the optical fibers (161, 101 to 105) exhibit advantageously a core of approximately 10 μm, a cladding of approximately 125 μm and a coating of approximately 250 μm, and the lenses (171 to 175) have a focal length of approximately 500 μm and a diameter of approximately 250 μm
   wherein a pitch between at least two consecutive lenses corresponding to input fibers is equal to a pitch between each consecutively arranged fiber.

18. A device according to claim 1, wherein the pitch between adjacent ends of the input and output fibers is the same.

19. A device according to claim 1, wherein ends of the input and output fibers are located in a same end plane.

20. A device according to claim 1, further comprising:
   a polarization separator optically positioned between the collimation optical element and the dispersing system.

* * * * *